United States Patent [19]

Haavisto

[11] Patent Number: 4,630,885

[45] Date of Patent: Dec. 23, 1986

[54] MULTICHANNEL OPTICAL WAVE GUIDE RESONATOR

[75] Inventor: John R. Haavisto, Scituate, Mass.

[73] Assignee: Northrop Corporation, Century City, Calif.

[21] Appl. No.: 585,577

[22] Filed: Mar. 2, 1984

[51] Int. Cl.⁴ .............................................. G02B 6/26
[52] U.S. Cl. ............................. 350/96.15; 350/96.12; 350/96.29; 356/350
[58] Field of Search .............. 350/96.10, 96.12, 96.13, 350/96.15, 96.16, 96.29, 96.30, 96.32, 96.33; 356/350; 372/6, 92, 93, 94

[56] References Cited

U.S. PATENT DOCUMENTS

| 3,354,405 | 11/1967 | Bebb et al. | 372/66 |
|---|---|---|---|
| 3,434,774 | 3/1969 | Miller | 350/96.32 |
| 3,529,205 | 9/1970 | Miller | 315/3.5 |
| 3,549,233 | 12/1970 | Eaglesfield et al. | 350/96.33 |
| 3,583,786 | 6/1971 | Marcatili | 350/96.32 |
| 3,666,348 | 5/1972 | Marcatili | 350/96.15 |
| 3,697,888 | 10/1972 | Danielmeyer | 372/94 |
| 3,760,297 | 9/1973 | Thompson | 372/94 |
| 3,773,289 | 11/1973 | Gloge | 250/211 J |
| 3,803,511 | 4/1974 | Thompson | 372/92 |
| 3,909,110 | 9/1975 | Marcuse | 350/96.15 |
| 3,936,144 | 2/1976 | Caton | 350/96.15 |
| 3,967,878 | 7/1976 | Caton | 350/96.15 |
| 4,136,929 | 1/1979 | Suzaki | 350/96.15 |
| 4,252,403 | 2/1981 | Salisbury | 350/96.15 |
| 4,264,126 | 4/1981 | Sheem | 350/96.15 |
| 4,266,851 | 5/1981 | Salisbury | 350/96.15 |
| 4,296,995 | 10/1981 | Bickel | 350/96.15 |
| 4,473,270 | 9/1984 | Shaw | 350/96.15 |
| 4,533,249 | 8/1985 | Webber | 356/350 |

FOREIGN PATENT DOCUMENTS

| 2029151 | 12/1971 | Fed. Rep. of Germany | 356/350 |
|---|---|---|---|
| 0203785 | 11/1983 | German Democratic Rep. | 350/96.15 |
| 83/2168 | 6/1983 | PCT Int'l Appl. | 350/96.15 |
| 1298387 | 4/1969 | United Kingdom | |

OTHER PUBLICATIONS

Stokes et al, "All-Single-Mode Fiber Resonator", *Optics Letters*, vol. 7, No. 6, Jun. 1982, pp. 288-290.

Haus et al, "Coupled Multiple Waveguide Systems", *IEEE Journal of Quantum Electronics*, vol. QE-19, No. 5, May 1983, pp. 840-844.

*Primary Examiner*—John Lee
*Attorney, Agent, or Firm*—Kenway & Jenney

[57] ABSTRACT

A multichannel optical waveguide resonator having a plurality of evanescently coupled optical dielectric waveguide rings and an input optical waveguide and an output optical waveguide located adjacent to one of the waveguide rings. The input and output dielectric waveguides are located for evanescent wave coupling of light into and out of one of the waveguide rings. The perimeters of the waveguide rings and the spacing therebetween are selected for evanescent coupling between the waveguides and so that light in the input waveguide reinforces with light in one of the concentric waveguides to create a resonator having an increased effective perimeter.

14 Claims, 3 Drawing Figures

U.S. Patent  Dec. 23, 1986  4,630,885

MULTICHANNEL OPTICAL WAVE GUIDE RESONATOR

BACKGROUND OF THE INVENTION

This invention relates to waveguide resonators and more particularly to a multichannel optical waveguide resonator.

It is known, for example, to employ passive ring optical resonators as rotation sensors for very accurately determining rotation rates as part of inertial navigation systems. The sensitivity of such devices in which light circulates in a ring is directly related to the effective cavity length or perimeter of the ring. Thus, rings with larger perimeters theoretically will have greater sensitivity. With a single ring resonator, however, increasing the effective cavity length by increasing the perimeter leads to a sensor which is physically larger, a definite disadvantage when the rotation sensor is to be used in an airborne device.

It is therefore an object of this invention to provide a passive ring waveguide resonator in which the effective cavity length is increased many times over the actual perimeter of the waveguide resonator.

Another object is such a resonator in which the sensitivity is improved by several orders of magnitude over a single channel optical waveguide resonator.

Yet another object of this invention is an optical waveguide resonator which is relatively easy to manufacture and capable of long lifetimes.

SUMMARY OF THE INVENTION

The above set forth objects of this invention are met by a multichannel optical waveguide resonator which includes an input waveguide, an output waveguide and a plurality of waveguide rings arranged in a repetitive pattern. The waveguide rings can be any closed shape such as circles, ellipses, squares or irregular shaped closed curves. The input and output waveguides are located for evanescent coupling of light into and out of at least one of the waveguides in the repetitive pattern. The perimeters and location of the waveguide rings in the repetitive pattern of waveguide rings are selected for evanescent coupling between the waveguide rings and also so that light in the input waveguide reinforces with light in at least one of the waveguides in the repetitive pattern.

In a preferred embodiment, the repetitive pattern includes a plurality of concentric dielectric waveguides whose perimeters and the spacing therebetween are selected for evanescent coupling therebetween. In this embodiment, the input dielectric waveguide and the output dielectric waveguide are straight and are located adjacent to the outermost one of the concentric waveguides for evanescent coupling of light into and out of the outermost one of the concentric waveguides. The concentric waveguides are weakly coupled, that is, substantially only adjacent ones of the concentric waveguides are evanescently coupled. It is preferred that the dielectric waveguide rings be manufactured of a low loss material such as glass.

In another embodiment of the invention, the waveguides in the repetitive pattern are stacked in a spaced apart fashion rather than being concentric.

BRIEF DESCRIPTION OF THE DRAWING

The invention disclosed herein may be better understood with reference to the following drawing of which.

DESCRIPTION OF THE PREFERRED EMBODIMENTS

Figure 2:
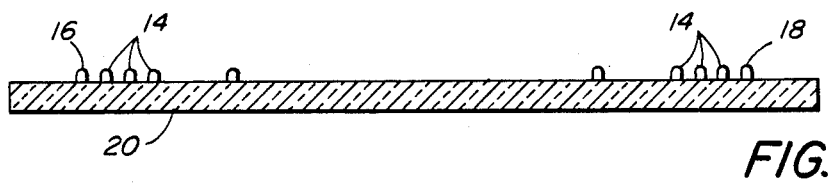
FIG. 2 is a cross-sectional view of the resonator of FIG. 1 taken along reference lines 2—2.
Figure 3:
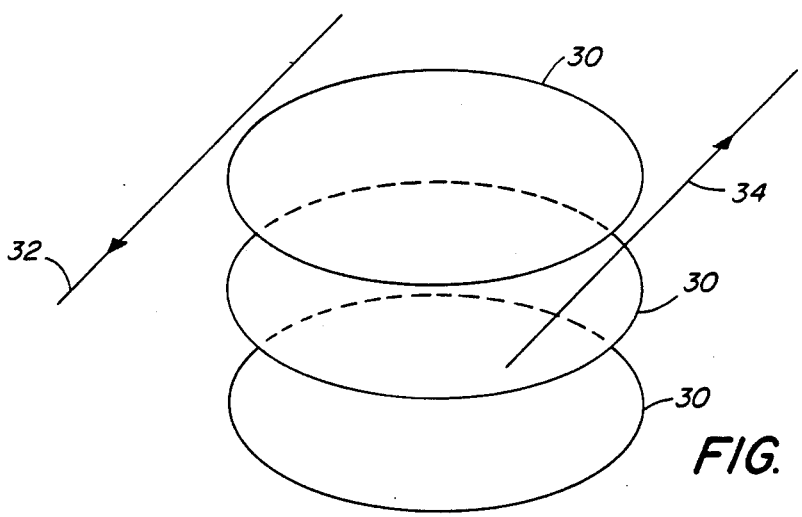
FIG. 3 is a schematic perspective view of an embodiment in which the waveguides are in a stacked configuration.

The principles of operation of the multichannel optical waveguide resonator disclosed herein will now be described with reference to FIGS. 1, 2 and 3. Operation of a multichannel optical waveguide resonator 10 is based on the synchronous exitation of the normal modes of the concentric waveguide structure 12 of the waveguide resonator 10. The waveguide structure 12 contains N waveguides 14 which are in the form of concentric rings. Also included are a straight input dielectric waveguide 16 and a straight output dielectric waveguide 18. With reference to the cross-sectional view of FIG. 2, the dielectric waveguides 14, 16 and 18 are preferably made of a low loss material such as zinc oxide on a glass substrate 20. The waveguides can also be made of doped plexiglas. Thus, each of the waveguides 14, 16 and 18 are optical conduits suitable for propagating light radiation. The spacing between the input and output straight waveguides 16 and 18 and the outermost one of the concentric waveguides 14 is selected so that these waveguides are weakly coupled. Similarly, the concentric waveguides 14 are also weakly coupled. This is achieved by a spacing which insures that the evanescent fields overlap only slightly resulting in near neighbor interactions only. That is, light traveling in the input straight dielectric waveguide 16 will couple into only the outermost of the concentric waveguides 14. Similarly, light traveling in the concentric waveguides 14 will couple into only those waveguides adjacent to it. The spacings between the input and output waveguides 16 and 18 and the outermost one of the concentric waveguides 14, and the spacing between the concentric waveguides 14 themselves is in the range of 4 microns. The width of the waveguides 14 is approximately 4 microns and they have a depth of 6 microns. The waveguides' 14 have an index differential in the range of 0.01–0.02 and have low loss of less than 0.001 $cm^{-1}$.

Light, for example from a laser source (not shown), traveling in the input dielectric waveguide 16 will couple into the outermost of the concentric waveguides 14 via the process of evanescent wave coupling. As the light circulates in the outermost of the concentric waveguides 14, light will be coupled into the next of the concentric waveguides 14 and so on throughout the series of concentric waveguides. Thus, light injected into the series of concentric waveguides 14 will redistribute itself throughout the series of concentric rings eventually returning to the outermost of the concentric waveguides 14. Light is also coupled from the outermost of the concentric waveguides 14 to the output dielectric waveguide 18 for subsequent processing.

Figure 1:
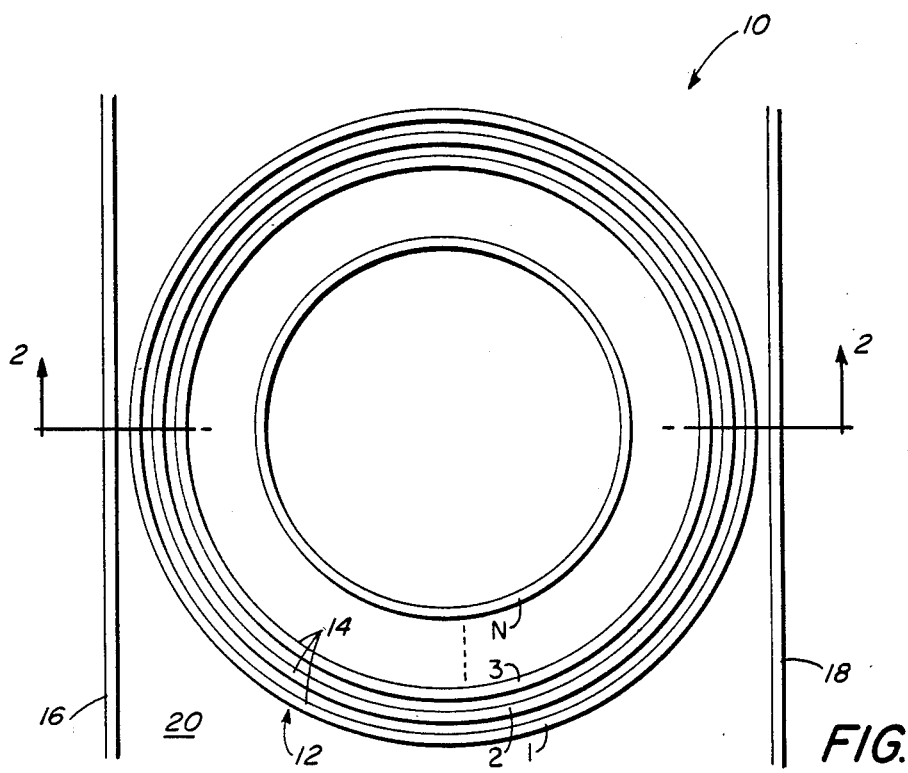
FIG. 1 is a schematic plan view of the resonator disclosed herein having concentric waveguides.

For a structure containing N waveguides such as the concentric rings 14 of FIG. 1, there will be N normal modes of the light circulating within the concentric waveguides 14. The initial distribution of normal modes evolves as light propagates throughout the concentric waveguides 14. In order to reinforce with light entering the concentric waveguides 14 and to act as a resonator, two conditions must be met. First of all, light in the concentric waveguide system must be in the outermost of the concentric waveguides 14 in the region of the input and output dielectric waveguides 16 and 18. In addition, light in the outermost of the concentric waveguides 14 must be in phase with light in the input dielectric waveguide 16. This latter condition is simply that the perimeter of the outermost of the concentric waveguides 14 must be an integral number of wavelengths. The first condition is that the perimeter of the outermost of the concentric waveguides 14 must be an integral number of coupling lengths in the multichannel waveguide system 10. The coupling length is a function of the waveguide parameters and the spacing between the concentric waveguides 14. Stated another way, for appropriate waveguide propagation constants $\beta_o$ and coupling constants $K_i$, the evolution of the exitations will be such that the N exitations will constructively interfere to produce the normal modes of the multiwaveguide resonator system 10. Under these conditions, the resonance conditions necessary to sustain the normal modes are $$\beta_o(Np) = n_1\pi, \quad K_i(Np) = n_2\pi$$

where the integers $n_1$ and $n_2$ are related and p is the perimeter. The effect of normal mode resonance is to replace the perimeter p of the outermost of the concentric rings 14 with an equivalent perimeter Np, thus reducing the free spectral range by a factor of N and resulting in higher sensitivity when the multichannel waveguide resonator system 10 is used, for example, as a rotation sensor. This is the case since the effective resonator cavity length of the evanescently coupled concentric waveguides 14 is increased by a factor approaching N, the total number of concentric waveguides.

As an aid to a fuller understanding of the multichannel resonator system 10 disclosed herein, an example for the case of N=2, that is, two concentric waveguides, will be discussed. The normal modes in this case consist of equal field amplitudes in each of the two concentric waveguides, either in phase (even) or out of phase (odd) with each other. The propagation constants in this case are $\beta_\pm = \beta_o \pm K$. When light is coupled into the outermost of the concentric waveguides 14, the energy will oscillate between the two channels. If the perimeter of the outermost of the waveguides is such that all the light is in the inner ring after one circuit, a normal mode can exist if the proper phase is maintained between the inner and outer ring. These conditions can be expressed as $$\beta_o 2p = (2n_1+1)\pi, \quad K2p = (2n_2+1)\pi$$

or $$(\beta_o + K)p = (n_1 + n_2 + 1)\pi (\beta_o - K)\, p = (n_1 - n_2)\pi.$$

In this case, the integers $n_1$ and $n_2$ are related by $$\beta_o = K(2n_1+1)/(2n_2+1).$$

At this point, it should be noted that the multichannel optical waveguide resonator of this invention need not consist of concentric rings of waveguides as shown in FIG. 1, but can be embodied in other repetitive patterns. It is necessary only that the waveguide rings have a closed shape and are located so that adjacent ones of the rings are evanescently coupled. One such alternative is illustrated in FIG. 3. In FIG. 3, three circular waveguides 30 are shown stacked one above the other. Three waveguides only are illustrated for the sake of clarity. An input dielectric waveguide 32 and an output dielectric waveguide 34 are located adjacent to the uppermost of the circular dielectric waveguides 30 at an appropriate separation for weak evanescent coupling. Light traveling in the input dielectric waveguide 32 will couple via evanescent wave coupling into the uppermost of the concentric waveguides 30. Light traveling in the uppermost waveguide 30 will redistribute itself throughout the other two of the circular waveguides 30 eventually returning to the uppermost one. This case is completely analogous to the case of concentric waveguides discussed in conjunction with FIG. 1 above. Thus, with this configuration, the effective perimeter of the waveguide is increased by a factor of three and the corresponding linewidth is unchanged, again assuming a low loss condition. As in the embodiment discussed above in conjunction with FIG. 1, the spacings between the input waveguide 32 and the output waveguide 34 and the uppermost circular ring 30, as well as the spacings among the circular waveguides 30 themselves are selected for weak or near neighbor evanescent wave coupling.

It is thus seen that the objects of this invention have been achieved in that there has been disclosed a multichannel waveguide resonator which can increase the effective cavity length of an optical resonator. When used as a rotation sensor, the waveguide resonator is thus many times more sensitive than a single turn device. The results are achieved by associating a plurality of waveguides closely spaced from one another for weak evanescent wave coupling therebetween.

It is recognized that modifications and variations of the multichannel waveguide resonator disclosed and claimed herein will occur to those skilled in the art. It is intended that all such variations and modifications be included within the scope of the appended claims.

What is claimed is:

1. Multichannel optical waveguide resonator comprising:
   an input dielectric waveguide;
   an output dielectric waveguide; and
   a plurality of coupled dielectric waveguide rings;
   wherein said input and said output dielectric waveguides are coupled to one of said coupled waveguide rings for evanescent wave coupling of light into and out of said one of said waveguide rings; and wherein the perimeters of said waveguide rings and the spacing therebetween are selected for evanescent coupling therebetween so that light in the input waveguide reinforces with light in said one of said waveguide rings.

2. The resonator of claim 1 wherein said input and output dielectric waveguides are straight.

3. The resonator of claim 1 wherein said waveguide rings are weakly coupled.

4. The resonator of claim 3 wherein only adjacent ones of said waveguide rings are evanescently coupled.

5. A resonator as claimed in claim 1 having N waveguide rings, the outermost waveguide ring having a perimeter p, and having a propogation constant $\beta_o$ and a coupling constant K wherein $$\beta_o(Np) = n_1\pi \text{ and } K(Np) = n_2\pi$$

where $n_1$, and $n_2$ are integers.

6. The resonator of claim 5 in which N=2 and $$\beta_o = K\left(\frac{2n_1 + 1}{2n_2 + 1}\right).$$

7. The resonator of claim 1 wherein said dielectric waveguide rings are doped plexiglas supported on a quartz substrate.

8. The resonator of claim 1 wherein the perimeter of an outermost of said waveguide rings is approximately 30 cm.

9. The resonator of claim 1 wherein said coupled dielectric waveguide rings are concentric.

10. The resonator of claim 1 wherein said coupled waveguide rings are circular.

11. The resonator of claim 1 wherein said waveguide rings are made of a low loss electro-optic material.

12. The resonator of claim 1 wherein said waveguide rings are made of zinc oxide.

13. Multichannel optical waveguide resonator comprising:
   an input waveguide;
   an output waveguide; and
   a plurality of waveguide rings arranged in a repetitive pattern;
   wherein said input and said output waveguides are located for evanescent coupling of light into and out of at least one of said waveguides in said repetitive pattern; and wherein the parameters and location of said waveguide rings in said repetitive pattern of waveguides are selected for evanescent coupling therebetween so that light in the input waveguide reinforces with light in said at least one of said waveguide rings.

14. The resonator of claim 13 wherein said repetitive pattern comprises a stack of evanescently coupled waveguide rings of the same diameter.

* * * * *